United States Patent
Lemke et al.

(10) Patent No.: US 9,776,610 B2
(45) Date of Patent: Oct. 3, 2017

(54) MODULAR LEAKAGE PROTECTION DEVICE

(71) Applicant: Lucas Automotive GmbH, Koblenz (DE)

(72) Inventors: Klaus Lemke, Borod (DE); Daniel Noll, Andernach (DE); Martin Sakalla, Cologne (DE); Lothar Zeuner, Steineroth (DE)

(73) Assignee: Lucas Automotive GmbH, Koblenz (DE)

( * ) Notice: Subject to any disclaimer, the term of this patent is extended or adjusted under 35 U.S.C. 154(b) by 0 days.

(21) Appl. No.: 14/785,571

(22) PCT Filed: Feb. 13, 2014

(86) PCT No.: PCT/EP2014/052777
§ 371 (c)(1),
(2) Date: Oct. 19, 2015

(87) PCT Pub. No.: WO2014/170044
PCT Pub. Date: Oct. 23, 2014

(65) Prior Publication Data
US 2016/0075317 A1 Mar. 17, 2016

(30) Foreign Application Priority Data
Apr. 19, 2013 (DE) .................. 10 2013 006 870

(51) Int. Cl.
*B60T 11/16* (2006.01)
*B60T 11/22* (2006.01)
(Continued)

(52) U.S. Cl.
CPC ............... *B60T 11/16* (2013.01); *B60T 11/22* (2013.01); *B60T 11/26* (2013.01); *B60T 17/04* (2013.01); *F16K 3/30* (2013.01); *F16K 27/04* (2013.01)

(58) Field of Classification Search
CPC .......... B60T 11/16; B60T 11/22; B60T 11/26; B60T 17/04; F16K 3/30; F16K 3/316;
(Continued)

(56) References Cited

U.S. PATENT DOCUMENTS 2,251,071 A * 7/1941 Scott .................. A01J 5/044
200/61.86
4,934,144 A * 6/1990 Larin .................. B60T 11/26
251/149.6
(Continued)

FOREIGN PATENT DOCUMENTS

DE 3304567 A1 8/1984
DE 3912110 A1 10/1990
(Continued)

OTHER PUBLICATIONS

PCT International Search Report and Written Opinion, Application No. PCT/EP2014/052777, dated Jul. 28, 2014.

*Primary Examiner* — Logan Kraft
(74) *Attorney, Agent, or Firm* — MacMillan, Sobanski & Todd, LLC (57) ABSTRACT

The invention relates to a modular leakage protection device for a fluid container of a vehicle brake system. The modular leakage protection device comprises a housing which attaches the modular leakage protection device to a fluid discharge opening of the fluid container. The modular leak protection device further includes a switching element, which can be moved between an open position, in which a fluid passage in the housing is released, and a closed position, in which the fluid passage is closed. The switching
(Continued)

element is preloaded into the closed position by means of at least one to preloading means.

16 Claims, 9 Drawing Sheets

(51) Int. Cl.
  *B60T 11/26* (2006.01)
  *B60T 17/04* (2006.01)
  *F16K 3/30* (2006.01)
  *F16K 27/04* (2006.01)
(58) Field of Classification Search
  CPC ......... F16K 27/04; F16L 37/40; F16L 37/407; F16L 37/413; F16L 37/42; F16L 37/44; F16L 37/46; F16L 37/47
  See application file for complete search history.

(56) References Cited

U.S. PATENT DOCUMENTS

| | | |
|---|---|---|
| 5,066,940 A | 11/1991 | Schmidt |
| 5,582,201 A * | 12/1996 | Lee .................. F16L 29/02 137/454.2 |
| 5,937,649 A | 8/1999 | Barz et al. |
| 6,928,814 B2 | 8/2005 | Lange |

FOREIGN PATENT DOCUMENTS

| | | |
|---|---|---|
| EP | 0049657 A1 | 4/1982 |
| EP | 0336186 A2 | 10/1989 |
| EP | 0340186 A1 | 11/1989 |
| EP | 2216220 A1 | 8/2010 |
| GB | 2230831 A | 10/1990 |
| WO | 98/12087 | 3/1998 |
| WO | 03/012331 A1 | 2/2003 |

\* cited by examiner

MODULAR LEAKAGE PROTECTION DEVICE

CROSS-REFERENCE TO RELATED APPLICATIONS

This application is the National Phase of International Application PCT/EP2014/052777 filed Feb. 13, 2014 which designated the U.S. PCT/EP2014/052777 claims priority to German Patent Application No. 10 2013 006 870.3, filed Apr. 19, 2013. The disclosures of both applications are incorporated herein by reference.

BACKGROUND OF THE INVENTION

This invention relates in general to a modular leak prevention device for a fluid container of a vehicle brake system.

From the background art various leak prevention devices are known, which are in each case integrated into the fluid container.

The document WO 03/012331 A1 for example discloses a hydraulic fluid container for a hydraulic vehicle brake system. The hydraulic fluid container has two integrally moulded cylindrical connecting pieces. Disposed in each connecting piece of the hydraulic fluid container is a one-piece valve member, which is displaceable between a first and a second position. A spring preloads the valve member into its first position. In the first position of the valve member a sealing collar provided on the valve member interacts with an annular sealing seat that projects inwards from an inner surface of the connecting piece of the hydraulic fluid container, so that the connecting piece is closed off.

Furthermore, the document DE 3 912 110 A1 discloses a top-up container with a connecting piece. Situated in the connecting piece is a check valve, which comprises a closure body, an actuating element, a spring and a sealing seat that is integrated into the base of the top-up container. The spring is supported against an apparatus comprising a support plate, which is held against the base by struts, and said struts.

The document EP 0 336 186 A1 describes a brake fluid container, on which a discharge neck is provided. Formed on an inner circumferential surface of the neck of the brake fluid container is a sealing seat for a valve element. The valve element is preloaded by a spring in the direction of the sealing seat.

The apparatuses known from the background art described above are integrated in the fluid container or take the form of a fixed component of the fluid container.

Depending on the type of vehicle and/or depending on the requirements of the vehicle manufacturer it is however not always necessary or desired to provide a fluid container with a leak prevention device. It is accordingly not possible to use standardized fluid containers.

Furthermore, in the event of defects in the leak prevention devices integrated in the fluid container, the entire fluid container always has to be exchanged along with the leak prevention device.

SUMMARY OF THE INVENTION

The invention provides a modular leak prevention device, which depending on the requirements of the vehicle manufacturer is attachable to the fluid container and with which a fluid container may also be retrofitted.

The modular leak prevention device according to the invention for a fluid container of a vehicle brake system comprises a housing, by means of which the modular leak prevention device can be attached to a fluid discharge opening of the fluid container, and a switching element, which can be moved between an open position, in which a fluid passage in the housing is released, and a closed position, in which the fluid passage is closed. The switching element is preloaded into the closed position by means of a preloading means.

As the modular leak prevention device is a separate assembly—i.e. an assembly that is independent of the fluid container—in which all of the components necessary for the leak prevention are provided in the housing of the modular leak prevention device, standard fluid containers may be quickly and easily retro-fitted with such a modular leak prevention device. What is more, due to the modular nature of the leak prevention device according to the invention it may be exchanged quickly and easily, which is advantageous for example if a defect occurs in the leak prevention device.

A further advantage of the modular leak prevention device according to the invention is that it remains possible to use standard fluid containers, which, if need be and depending on the requirements of the vehicle manufacturer, may be provided with such a modular leak prevention device. Thus, regardless of the leak prevention device high piece numbers of standard fluid containers may be produced, this having an advantageous effect upon production costs and/or the unit prices. There is therefore no need to manufacture fluid containers that are adapted to the leak prevention device. The fluid containers also no longer have to be provided with complex geometries such as relief cuts and the like, as is necessary in the case of the fluid containers with leak prevention devices that are known from the background art.

According to an embodiment of the invention in the housing of the modular leak prevention device a sealing seat may be formed, against which the switching element lies in the closed position, i.e. the fluid passage is closed. In the state of attachment to a fluid container the modular leak prevention device according to the invention will occupy the closed position only if the fluid container together with the modular leak prevention device is removed from the brake system of the vehicle, or if the fluid container in the event of the vehicle having an accident becomes detached from the vehicle brake system. Thus, in the described situations a leaking of the brake fluid from the fluid container is prevented.

According to a development of the invention the switching element is designed in such a way that in the closed position and in the open position it may project at least in sections from an outlet opening for the fluid out of the housing. In the closed position the switching element projects further from the housing than in the open position, i.e. than in the actuated state. When the fluid container with the modular leak prevention device is attached to a vehicle brake system and/or to a master brake cylinder, the switching element comes into contact with a portion of the master brake cylinder and is actuated, i.e. moved into the open position. So long as the fluid container is attached to the vehicle brake system, the switching element remains in contact with a portion of the master brake cylinder and is therefore held in the open position. In other words, the portion of the switching element that projects from the housing of the modular leak prevention device forms an actuating portion, by means of which the modular leak prevention device is movable from the closed position into the open position.

According to a development of the invention in the housing of the modular leak prevention device at least one inlet opening for the fluid may be formed. In the open position of the switching element the at least one inlet opening for the fluid forms a portion of the fluid passage released by the switching element, so that the fluid may flow out of the fluid container through the leak prevention device to the vehicle brake system.

The preloading means may communicate preferably with the housing and the switching element. The preloading means may be a compression spring, a tension spring element or a rubber element. Here, the determining factor for the choice of the type of preloading means is that the preloading means is capable of preloading the switching element into its closed position.

According to a development of the invention the switching element may comprise a valve portion that is designed to interact with the housing-side sealing seat. In order to ensure that the leak prevention device is sealed tight in the closed position of the switching element, i.e. no leaking of the fluid from the fluid container is possible, the shape of the valve portion of the switching element is adapted to the shape and/or the structural design of the sealing seat in the housing of the modular leak prevention device. In this case further sealing elements, such as O-rings or the like, may moreover be provided also on the switching element and/or the sealing seat. The valve portion of the switching element that comes into contact with the sealing seat may in this case at least in sections be of a conical or spherical design.

According to a development of the invention the switching element may comprise an actuating portion that is star-shaped or round in cross section. Here, by the actuating portion is meant the portion that projects together with its front end from the housing of the leak apparatus and which may be actuated by the vehicle brake system when the actuating portion comes into action with the vehicle brake system. In other words, by means of the actuating portion the switching element may be moved from the closed position into the open position. If the actuating portion is of a star-shaped design in cross section, the actuating portion comprises a plurality of webs, between which gaps are formed to allow an unhindered flow of the fluid from the fluid container through to the vehicle brake system in the open state of the leak prevention device. The webs of the star-shaped cross section of the switching element further serve as a guide for the switching element in the housing of the modular leak prevention device. For this purpose the webs may for example lie at least in sections against the housing. If the actuating portion is designed with a round cross section, a gap, which enables the fluid to flow through unimpeded, is formed between the outer circumferential surface of the actuating portion and the inner wall of the housing.

In order to be able to attach the housing of the modular leak prevention device to the fluid container, fastening means for fastening the modular leak prevention device to the fluid container may be formed on the housing of the modular leak prevention device. In this case, according to an embodiment the housing may be designed in such a way that it is attachable by means of a positive connection to the fluid container. The housing may moreover be provided with elements to form a click-, snap- or detent connection. In the case of click-, snap- or detent connections it is possible on the one hand to provide mutually corresponding formations for producing such connections on the housing and the fluid container. On the other hand, click-, snap- or detent formations, for example in the form of projections, may alternatively be provided only on the housing and produce a fixed connection to the fluid container by means of friction locking It is also conceivable that arrangements for forming a threaded connection or bayonet catch are provided on the housing for fastening the modular leak prevention device to the fluid container. It is moreover conceivable to fasten the modular leak prevention device to the fluid container by means of a retaining ring, for example by means of a retaining ring made of rubber.

According to a development of the invention the housing may comprise a removable closure element. Through this closure element for example the further components of the leak prevention device, such as the preloading means and the switching element, may be introduced into the modular leak prevention device and secured in the housing by means of the closure element.

In this connection, according to a development of the invention it may be provided that the preloading means extends between the closure element and the switching element. As a result, it is guaranteed that the preloading means is capable of preloading the switching element in the direction of the closed position.

The present invention further relates to a fluid container for a vehicle brake system having a modular leak prevention device of the previously described type. Preferably the modular leak prevention device may be in fastening engagement with an inner wall of a discharge neck of the fluid container.

The present invention also further relates to a master brake cylinder having a having a fluid container of the previously described type.

According to an embodiment the master brake cylinder may comprise an inlet neck for receiving the discharge neck of the fluid container, wherein the inlet neck of the master brake cylinder has a recess that may receive the actuating portion of the switching element of the modular leak prevention device.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
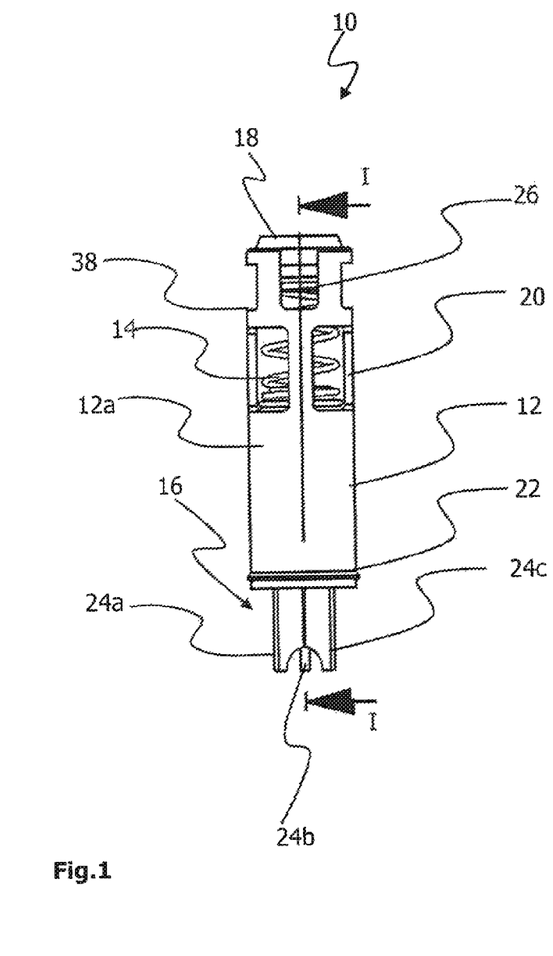
FIG. 1 is an elevational view of a first embodiment of a modular leak prevention device according to the invention.

Referring now to the drawings, there is illustrated in FIG. 1 a modular leak prevention device according to an embodiment of the invention, which is denoted generally by 10.

The modular leak prevention device 10 comprises a housing 12, in which a preloading means 14 and a switching element 16 are disposed. The housing 12 comprises a closure element 18, against which the preloading means 14 is supported. The preloading means 14 according to this embodiment is a compression spring that extends between the closure element 18 and the switching element 16. In the housing there are further provided fluid inlet openings 20, through which the fluid situated in a fluid container, which is not shown in FIG. 1, may flow into the modular leak prevention device 10. According to this embodiment there is formed on the housing 12 and/or on the outer wall 12a thereof a circumferential projection 22, which may be used to fasten the modular leak prevention device 10 and/or the housing 12 to a fluid container (not shown).

The switching element 16 comprises a plurality of webs 24a, 24b, 24c, i.e. the switching element 16 in this region is of a star-shaped design in cross section. By means of the webs 24a, 24b, 24c gaps are formed between an inner wall 12b (see FIG. 2) of the housing 12 and the switching element 16, which gaps allow the fluid to flow through the modular leak prevention device 10. The webs 24a, 24b, 24c are moreover used to guide the switching element 16 in the housing 12. The webs 24a, 24b, 24c for this purpose may be in sections in contact with the inner wall 12a of the housing 12.

The closure element 18 comprises an external thread or a detent projection 26 so that it may be attached to the housing 12.

Figure 2:
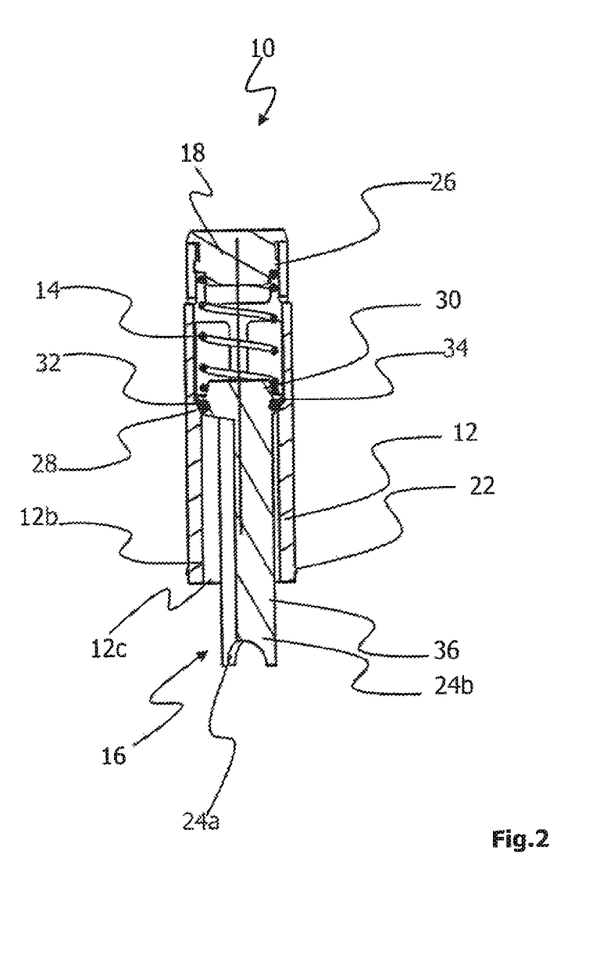
FIG. 2 is a cross sectioned, elevational view of the modular leak prevention device of FIG. 1.

FIG. 2 shows a sectional view of the modular leak prevention device 10 along the cutting line I-I in FIG. 1.

In the housing 12 there is formed a sealing seat 28, against which the switching element 16 lies in its closed position. For this purpose the switching element 16 comprises a valve portion 30, which is provided with a sealing face 32. In order in the closed position reliably to prevent a throughflow of fluid, a sealing ring 34, for example an O-ring, is provided on the sealing face 32 and lies against the sealing seat 28 in the housing 12.

According to this embodiment the housing 12 is of a tubular design and is closed at one end by the closure element 18. During assembly of the modular leak prevention device 10 the switching element 16 and the preloading means 14 are introduced into the housing 12 through the end of the housing 12, at which the closure element 18 is provided, before this end is closed by means of the closure element 18. The valve head 30 of the switching element 16 can therefore move only in a region of the housing 12 between the sealing seat 28 and the closure element 18. In other words, the said region of the housing 12 defines the possible travel of the valve portion 30 and/or of the switching element 16.

By means of the spring 14 the switching element 16 is preloaded into its closed position, in which the switching element 16 is applied by its valve portion 30 and/or by the sealing face 32 and the O-ring 34 against the sealing seat 28. If the modular leak prevention device 10 is actuated, i.e. the switching element 16 is moved in the direction of the closure element 18, the spring 14 is compressed and the fluid flowing in through the fluid openings 20 may flow between the valve portion 30 of the switching element 16 and the inner wall 12b of the housing 12 through the housing 12 and/or through the modular leak prevention device 10. In other words, in the open position of the switching element 16 the inlet openings 20 together with the webs 24a, 24b and 24c and the inner wall 12b of the housing 12 form a fluid passage, through which the fluid may flow out of the fluid container, which is not shown in FIG. 2, through the modular leak prevention device 10. The fluid then flows through an opening 12c in the housing 12 to the vehicle brake system (not shown). The opening 12c is provided at the opposite end of the housing 12 to the closure element 18.

From FIGS. 1 and 2 it may further be seen that the switching element 16 projects in axial direction of the modular leak prevention device 10 from the housing 12 and/or from the opening 12c of the housing 12. The portion of the switching element 16 that projects from the housing 12, together with its front end, forms an actuating portion 36, by means of which the switching element 16 is movable counter to the spring action of the spring 14 from its closed position into the open position. The actuating portion 36 in the closed position of the switching element 16 projects further from the housing 12 than in the open position of the switching element 16. The front end of the actuating portion 36 is provided with a recess in order to be able to guarantee a uniform fluid flow.

The switching element 16 may occupy three positions. In the previously described closed position the switching element 16 lies against the sealing seat 28 (no travel). In the open position of the switching element 16 the valve portion 30 of the switching element 16 is situated in axial direction approximately in the middle of the inlet openings 20 (half travel). As a third position an assembly position is provided, in which the switching element 16 is situated entirely in the housing 12 (total travel), i.e. the actuating portion 36 of the switching element 16 does not project from the housing 16. In the assembly position the spring 14 is fully compressed. FIG. 2 moreover shows once again the detent projection 22 on the housing 12 that seals off the housing 12 in the direction of the fluid discharge opening (not shown) of the fluid container.

From FIGS. 1 and 2 it is further evident that in the fastening region of the closure element 18 further openings and/or recesses 38 are provided, which likewise enable the fluid to flow in and which may be used to fasten the closure element 18.

The following figures show further embodiments of the modular leak prevention device. In the following, components of an identical type or with an identical effect are provided with the same reference characters, only with an additional number placed in front.

Figure 3:
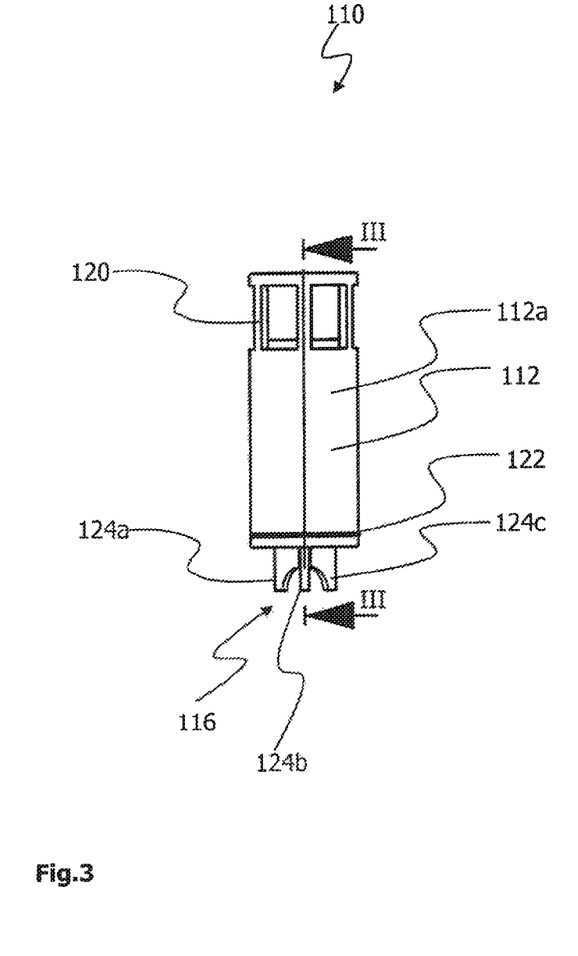
FIG. 3 is an elevational view of a second embodiment of a modular leak prevention device according to the invention.

FIG. 3 shows a second embodiment of a modular leak prevention device 110.

The modular leak prevention device 110 comprises a housing 112 with fluid inlet openings 120 and a circumferential detent projection 122. The switching element 116 that projects from the housing 112 comprises three webs 124a, 124b and 124c.

Figure 4:
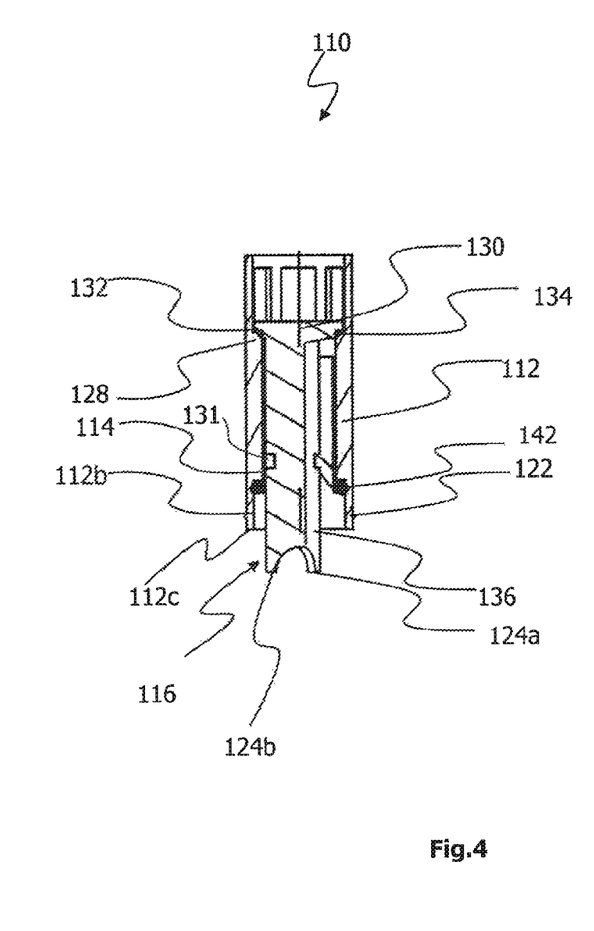
FIG. 4 is a cross sectioned, elevational view of the modular leak prevention device of FIG. 3.

FIG. 4 shows a sectional view of the modular leak prevention device 110 along the cutting line III-III of FIG. 3.

In the housing 112 the sealing seat 128 may be seen. The switching element 116 is provided with a valve portion 130, on which a sealing face 132 is formed. The sealing face 132 may come into abutment with the sealing seat 128 on the housing 112. The preloading means 114 according to this embodiment is a rubber restoring element. The preloading means and/or the rubber restoring element 114 is attached to the housing 112 in a fastening region 142 and extends along the inner wall 112b of the housing 112 to the switching element 116 and/or to a receiving groove 131 in the switching element 116, to which the rubber restoring element 114 is likewise attached, in order to be able to preload the switching element 116 into its closed position. The rubber restoring element 114 is fastened to the receiving groove 131 and/or is received at least in sections by the receiving groove 131. The receiving groove 131 is provided in each of the three webs 124a, 124b and 124c in the edge region thereof. The rubber restoring element 114 according to this embodiment may be of an annular design.

The mode of operation of the embodiment according to FIGS. 3 and 4 is very similar to that of the embodiment according to FIGS. 1 and 2 as the switching element 116 is moved by means of the actuating portion 136 counter to the preloading of the rubber restoring element 114 from its closed position into the open position, in which a fluid passage is released through the housing 112 from the inlet openings 120 between the switching element 116 and the inner wall 112b of the housing 112 along the switching element 116. The fluid then passes out of the modular leak prevention device 110 through the opening 112c of the housing 112.

Figure 5:
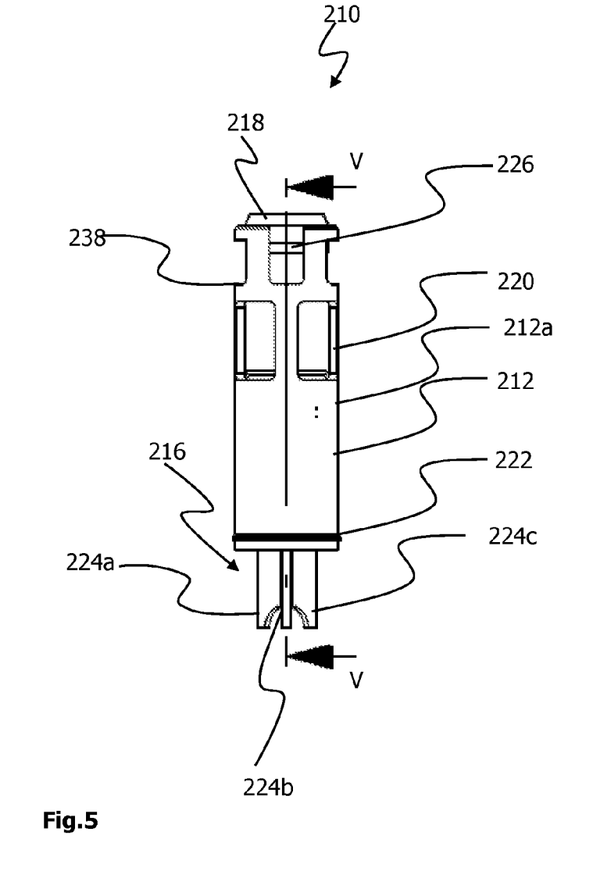
FIG. 5 is an elevational view of a third embodiment of the modular leak prevention device according to the invention.

FIG. 5 shows a third embodiment of the modular leak prevention device 210.

The modular leak prevention device 210 comprises the housing 212 having the fluid inlet openings 220 and the circumferential detent projection 222. The housing 212 further comprises a closure element 218. Projecting from the housing 212 is the actuating portion 236 of the switching element 216. The switching element 216 once again comprises three webs 224a, 224b and 224c.

In the region of the closure element 218 further openings 238 may moreover be formed in the housing 212.

Figure 6:
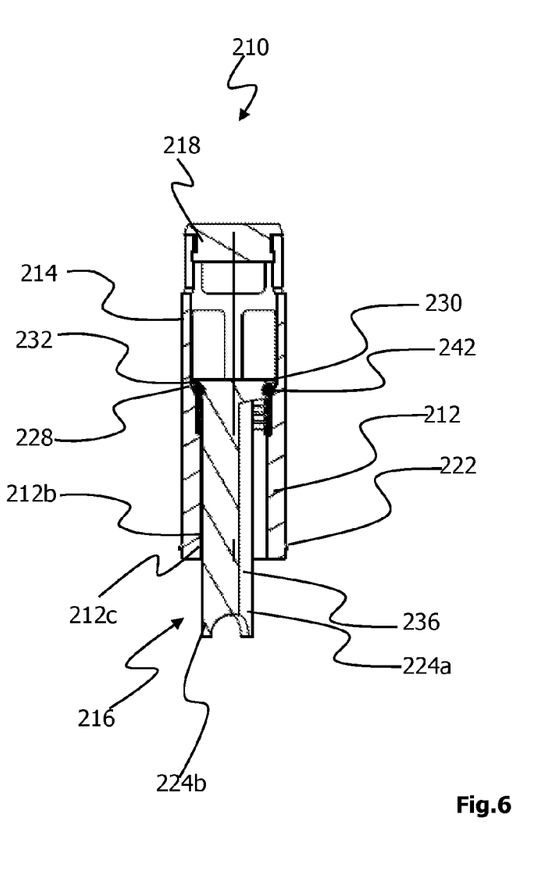
FIG. 6 is a cross sectioned, elevational view of the modular leak prevention device of FIG. 5.

FIG. 6 shows a sectional view along the cutting line V-V of FIG. 5.

The preloading means 214 according to the third embodiment is a tension spring, which is fastened at one end to the housing 212 and at the other end to the valve portion 230 of the switching element 216. The tension spring 214 extends along a portion of the inner wall 212b of the housing 212 between the fastening point 242 to the housing 212 and its fastening point to the valve portion 230 of the switching element 216. The closure element 218 is attached positively to the housing 212 and/or comprises a fastening projection 226.

Figure 7:
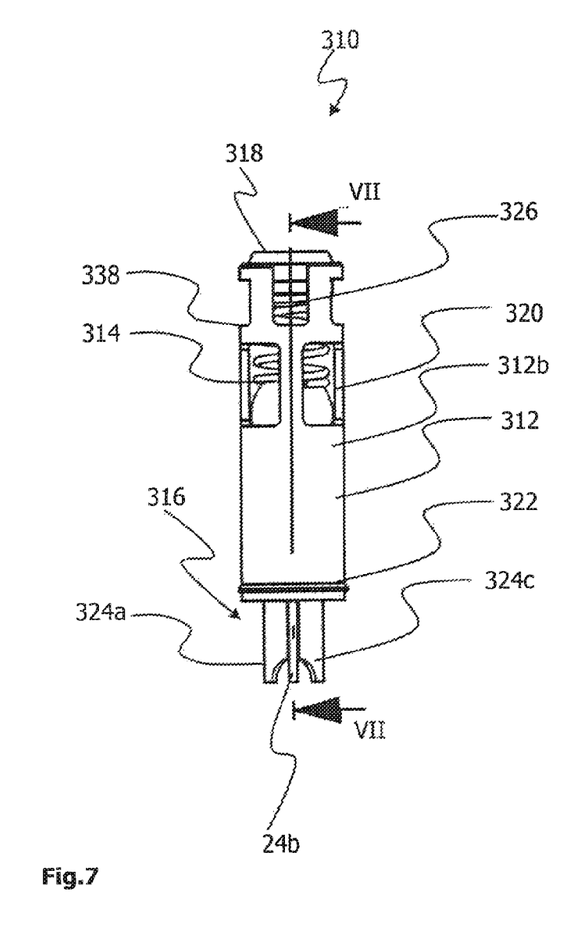
FIG. 7 is an elevational view of a fourth embodiment of the modular leak prevention device according to the invention.
Figure 8:
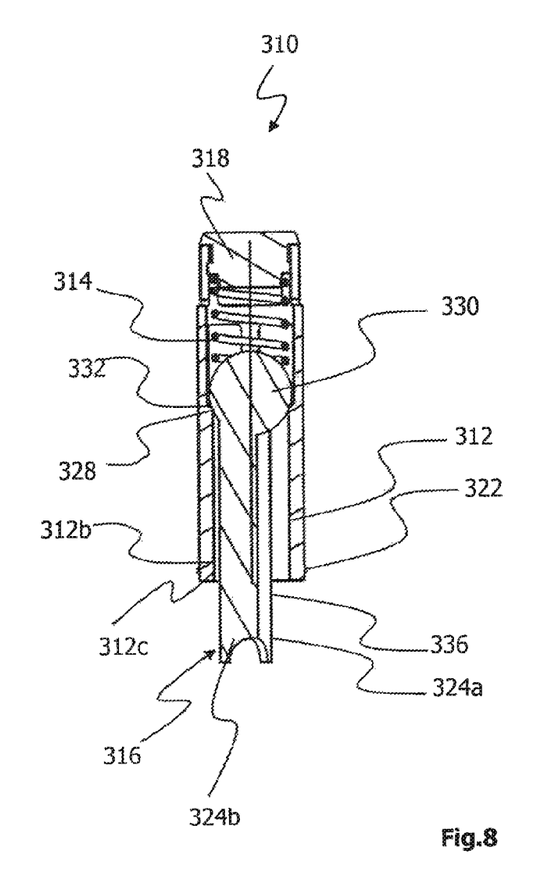
FIG. 8 is a cross sectioned, elevational view of the modular leak prevention device of FIG. 7.

FIGS. 7 and 8 show a fourth embodiment of the modular leak prevention device according to the invention.

The modular leak prevention device 310 according to FIG. 7 comprises the housing 312, the switching element 316 as well as the closure element 318. Extending between the closure element 318 and the switching element 316 is a preloading means 314, which according to this embodiment is once again a tension spring.

Formed on the housing 312 of the modular leak prevention device 310 are the inlet openings 320 and the circumferential detent projection 322. In the region of the closure element 318 there are likewise provided in the housing 312 openings 328, through which the fluid may likewise flow in.

FIG. 8 shows a sectional view along the cutting line VII-VII of FIG. 7.

In FIG. 8 it may be seen that the valve portion 330 of the switching element 316 according to this embodiment is of a spherical design, i.e. is ball-shaped in sections. The spherical valve portion 330 has a sealing portion 332, which lies against the sealing seat 328 formed in the housing 312. The sealing seat 328 here may be of a conical or curved design in order to form a fluid-tight seal with the sealing portion 332.

The actuating element 316 once again comprises three webs 324a, 324b, 324c and projects out of the housing 312 and/or out of the opening 312c in the housing 312.

As in the first embodiment the preloading means 314, i.e. the spring, disposed between the closure element 318 and the switching element 316 preloads the switching element 316 by the spherical valve portion 330 thereof in the direction of the closed position of the switching element 316, i.e. in the direction of the sealing seat 328.

The mode of operation of the fourth embodiment is identical to the mode of operation of the first embodiment.

Figure 9:
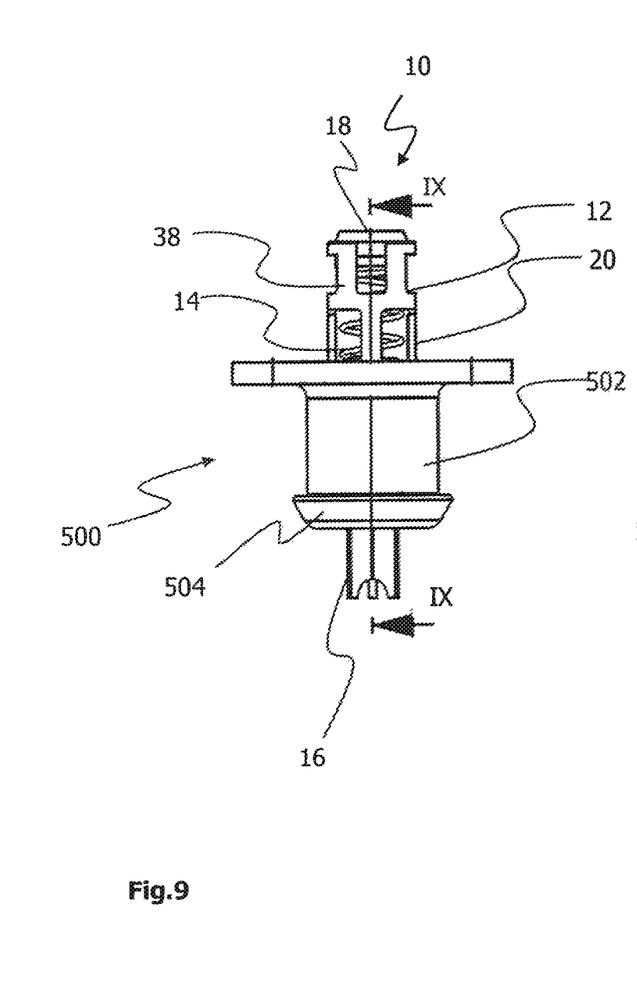
FIGS. 9 to 20 are elevational and cross sectioned elevational views of various embodiments for fastening the modular leak prevention device to a fluid container.

FIG. 9 shows a front view of the modular leak prevention device 10 according to the first embodiment in the state of attachment to a fluid container 500.

The fluid container 500 is illustrated in a cutout manner in FIG. 9. The fluid container 500 comprises an outlet neck 502, which is provided at its distal end with a detent lug 504. The discharge neck 502 comes with its detent lug 504 into engagement with a master brake cylinder, which is not shown in FIG. 9, in the state of attachment to a vehicle brake system.

From FIG. 9 it is further evident that the switching element 16 and/or its actuating portion 36 also projects from the outlet neck 502.

Figure 10:
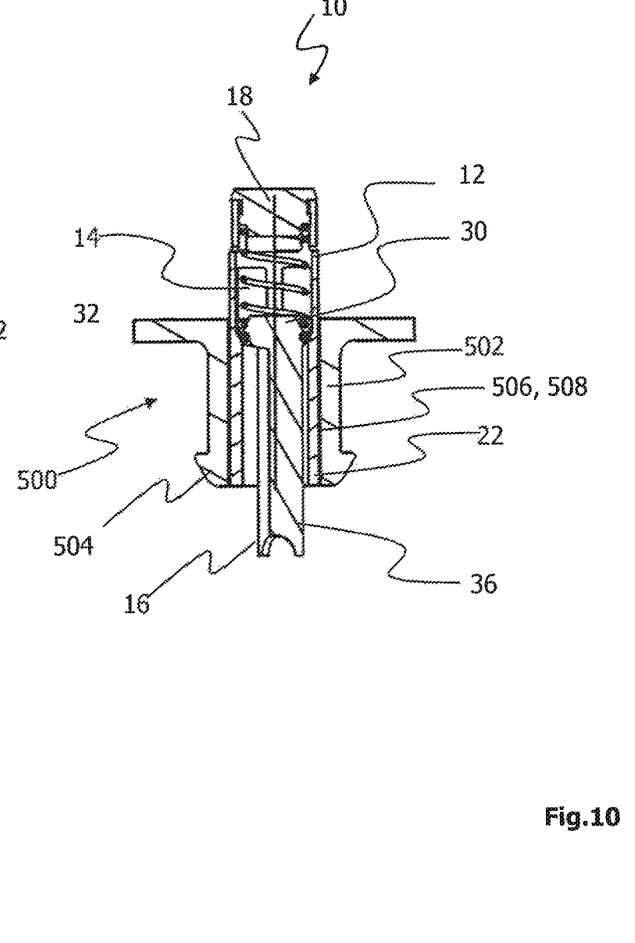

FIG. 10 shows a sectional view along a cutting line IX-IX of FIG. 9. In this case it may now be seen how the outer wall 12a of the housing 12 lies against the inner wall 506 of a fluid discharge opening 508 in the outlet neck 502. The circumferential detent projection 22 on the housing 12 of the modular leak prevention device is in engagement with the outlet neck 502 of the fluid container 500 and/or effects sealing relative to the inner wall 506 of the outlet neck 502.

Figure 11:
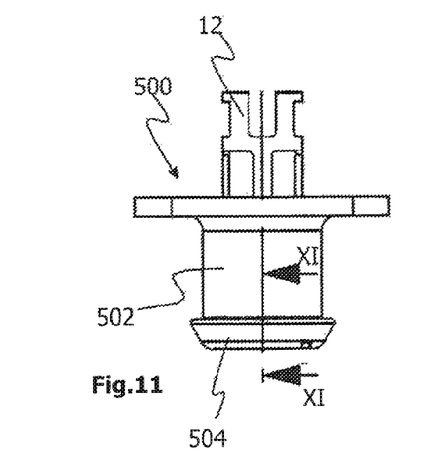
Figure 12:
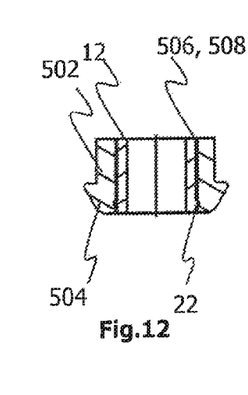

FIGS. 11 and 12 show an embodiment of a fastening of the housing 12 to the fluid container 500.

FIG. 11 in this case shows a view, in which only the housing 12 is shown in the fluid container 500 and/or in the discharge neck 502 of the fluid container 500.

FIG. 12 shows a sectional view along the cutting line XI-XI of FIG. 11.

According to FIGS. 11 and 12 the housing 12 is formed on the outlet neck 502 of the fluid container 500 by means of a positive connection, whereby the outer wall 12a of the housing 12 lies against the inner wall 506 of the outlet neck 502 and together with the circumferential detent projection 22 of the housing 12 produces a positive connection.

Figure 13:
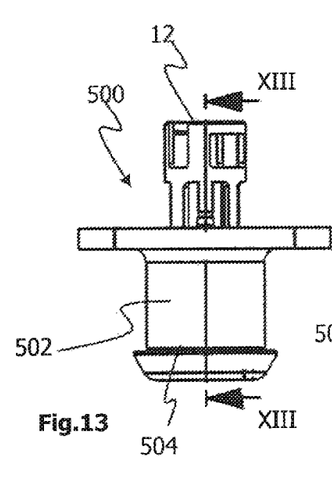
Figure 14:
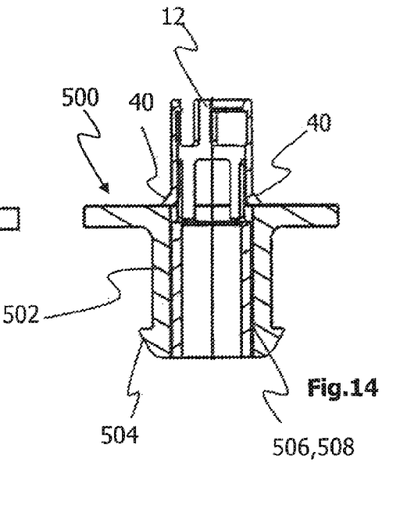

FIGS. 13 and 14 show a further embodiment of a fastening of the housing 12 to the fluid container.

According to this embodiment the housing 12 is disposed by means of a click connection on the fluid container 500. For this purpose click elements and/or snap elements 40 are formed on the housing 12 and are in engagement with the fluid container 500 and/or the opening 508 of the outlet neck 502. The click elements 40 in this case brace the housing 12 against the fluid container 500 and/or the inner wall 506 of the discharge neck 502. Here, it is also conceivable to provide on the housing 12 projecting detent elements and/or detent projections, which latch and/or engage into an indentation provided on the fluid container 500. It is also possible to form exclusively detent elements on the housing 12, which produce a friction locking with the fluid container 500 or the inner wall 506 of the discharge neck 502.

Figure 15:
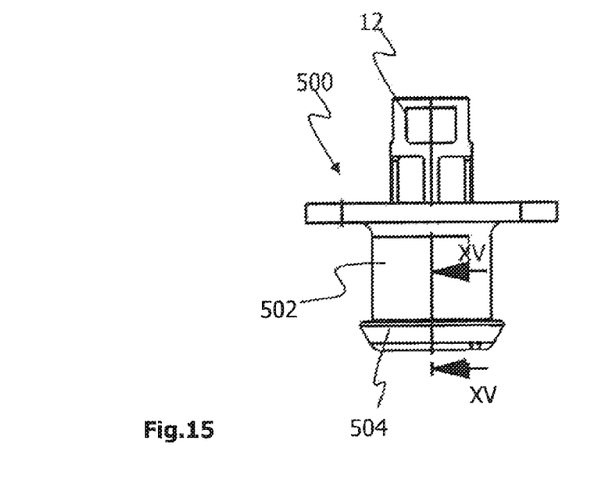
Figure 16:
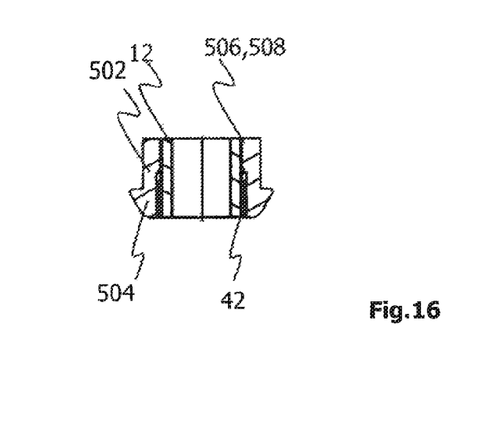

FIGS. 15 and 16 show a further embodiment of a fastening of the housing 12 to the fluid container 500 and/or to the discharge neck 502 of the fluid container 500.

According to this embodiment there is provided on the housing 12 an external thread 42, which optionally interacts with an internal thread provided on the inner wall 506 of the discharge neck 502. Furthermore, instead of a thread a bayonet catch may be used to fasten the housing 12 to the fluid container 500.

Figure 17:
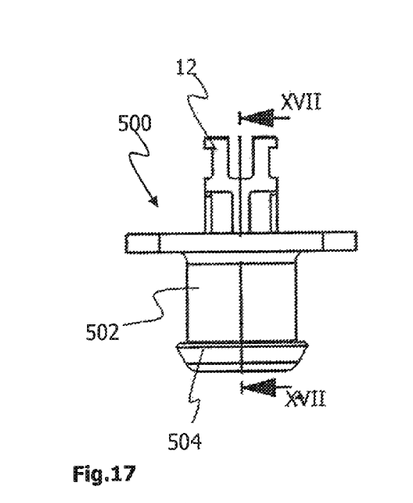
Figure 18:
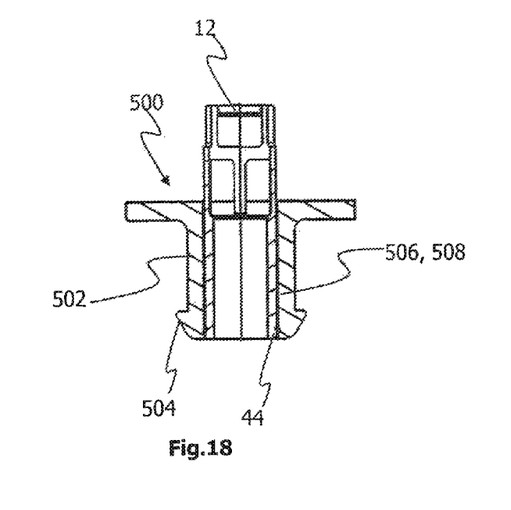

FIGS. 17 and 18 show a further embodiment of a fastening of the housing 12 to the discharge neck 502 of the fluid container 500.

In this case there is provided on the housing 12 a sealing element, for example a sealing ring made of rubber, by means of which the housing 12 is fastened to the inner wall 506 of the discharge neck 502. The rubber ring 44 may accordingly come into engagement with the inner wall 506 of the fluid container 500 in order to be able to attach the housing 12 to the fluid container 500.

Figure 19:
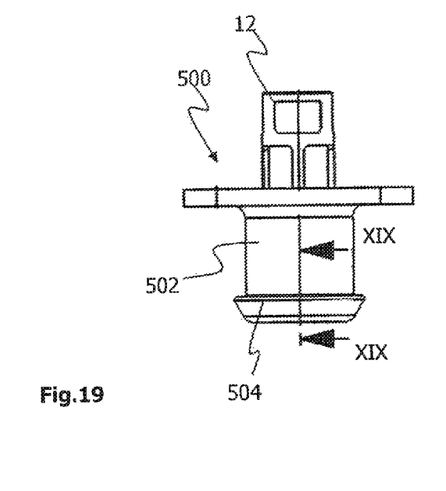
Figure 20:
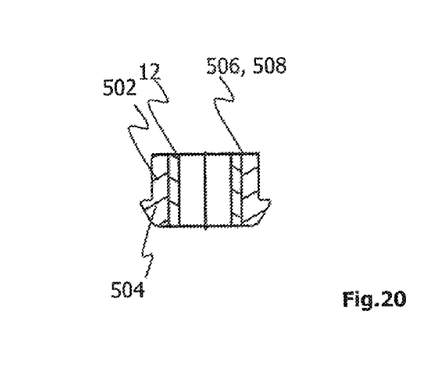

FIGS. 19 and 20 show a further example of a possible way of fastening the housing 12 to the discharge neck 502 of the fluid container 500. In this case the housing 12 is connected by welding either at an appropriate point to the discharge neck 502 and/or to the fluid container 500.

It is also possible for the housing 12 and/or the discharge neck 502 of the fluid container 500 to be heated and bent in the direction of the housing 12 or the discharge neck 502 in order to produce a fastening engagement between the housing 12 and the discharge neck 502 and/or the fluid container 500.

Figure 21:
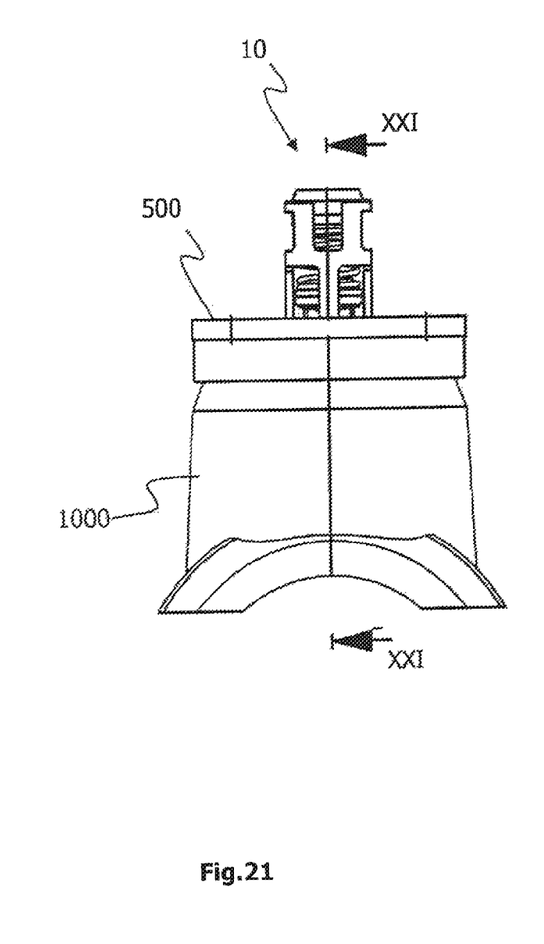
FIG. 21 is an elevational view of the modular leak prevention device according to the invention in the state of attachment to a brake system.
Figure 22:
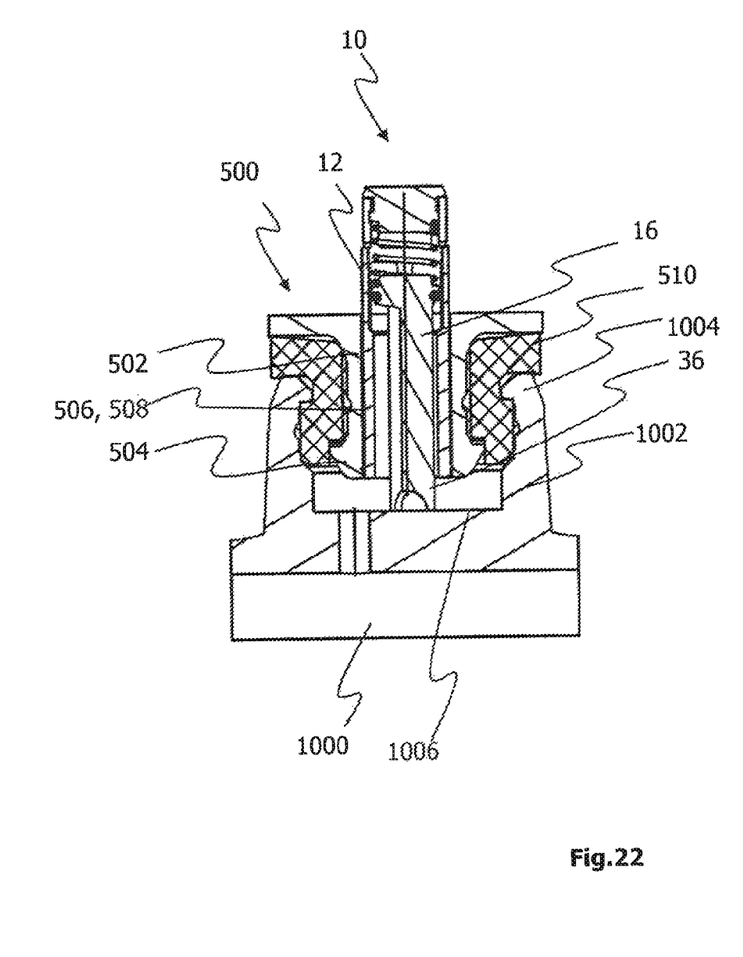
FIG. 22 is a cross sectioned, elevational view of the modular leak prevention device of FIG. 21.

FIGS. 21 and 22 show a modular leak prevention device 10 according to the first embodiment, which together with the fluid container 500 is attached to a master brake cylinder 1000, which is illustrated here in sections, of a vehicle brake system.

FIG. 22 shows a sectional view along the cutting line XXI-XXI of FIG. 21.

FIG. 22 once again shows the modular leak prevention device 10, which is fastened by its housing 12 to the discharge neck 502 of the fluid container 500. A gasket 510 is provided between the master brake cylinder 1000 and the fluid container 500. The detent lug 504 of the discharge neck 502 is in engagement with the gasket 510. The gasket 510 in turn is held by means of a detent lug 1004 of the master brake cylinder 1000 on the inlet neck 1002. According to FIG. 22 the modular leak prevention device 10 is situated in its open position, i.e. a fluid passage through the modular leak prevention device 10 and/or through the housing 12 is released by means of the switching element 16. For a comparison between open position and closed position of the switching element 16 reference may be made to FIGS. 1 and 2, which show the switching element 16 in the closed position.

The switching element 16 and/or its actuating portion 36 lies with its front end against a face 1006 of the master brake cylinder 1000. During the attaching of the fluid container 500 with the modular leak prevention device 10 to the master brake cylinder 1000 the switching element 16 and/or its front end is moved via the face 1006 counter to the preloading force of the spring 14 into its open position in order to allow fluid to flow through.

Figure 23:
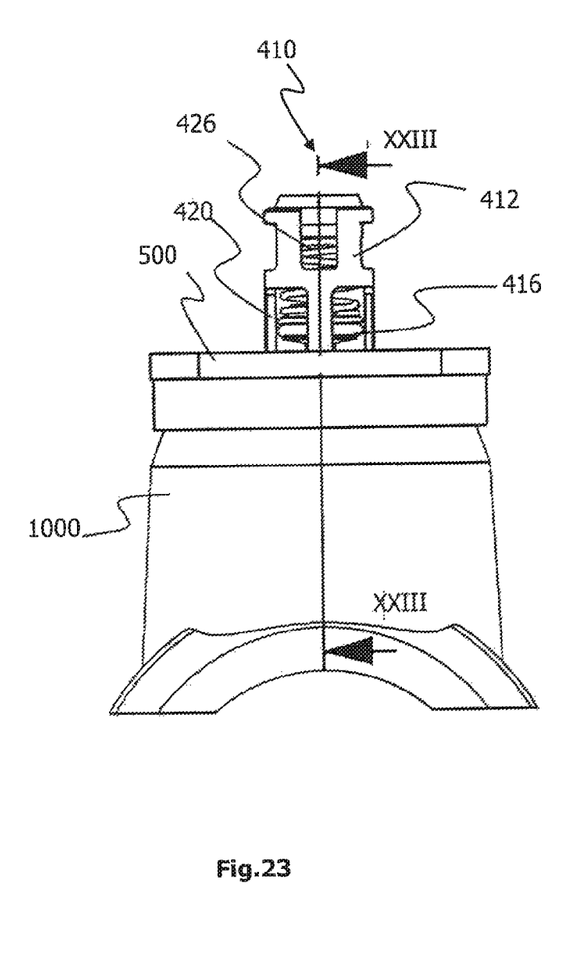
FIG. 23 is an elevational view of a fifth embodiment of the modular leak prevention device according to the invention in the state of attachment to the vehicle brake system.
Figure 24:
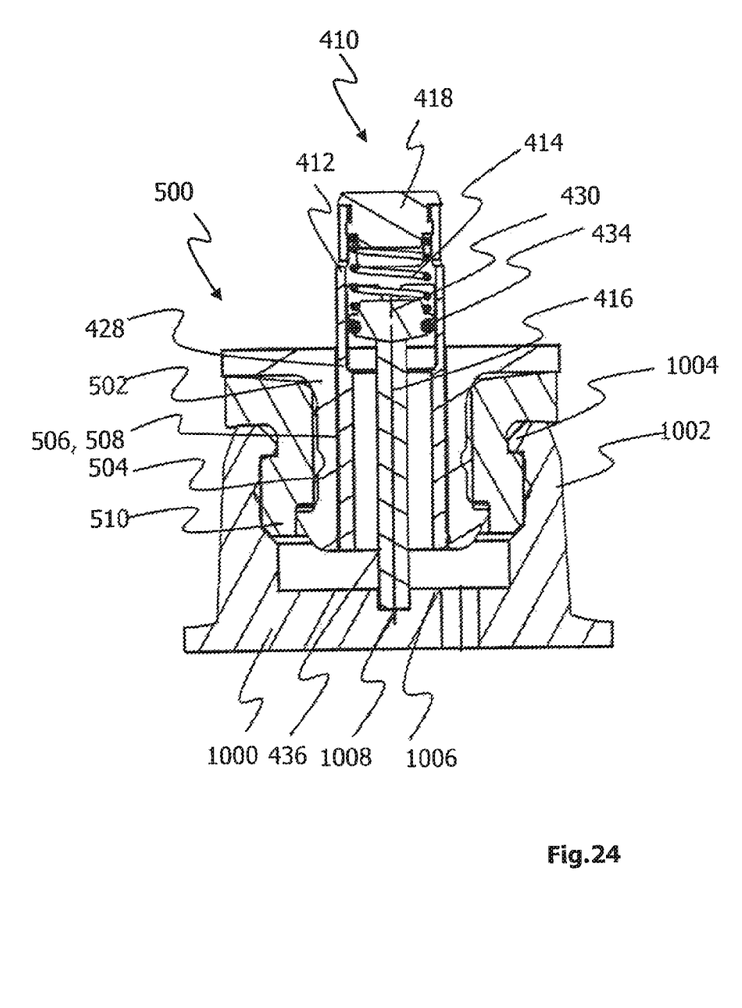
FIG. 24 is a cross sectioned, elevational view the modular leak prevention device of FIG. 23.

FIGS. 23 and 24 show a fifth embodiment of the modular leak prevention device 410 in a state, in which it is attached together with the fluid container 500 to the master brake cylinder 1000. Apart from a differently designed switching element 416, the fifth embodiment corresponds in construction and mode of operation to the construction of the first embodiment.

FIG. 24 shows a sectional view along the cutting line XXIII-XXIII of FIG. 23.

The modular leak prevention device 410 according to this embodiment once again comprises a switching element 416 having a valve portion 430, which has a sealing face 432 with a sealing ring 434. Between the valve portion 430 and a closure element 418 the preloading means 414 configured in the form of a compression spring is provided. The valve portion 430 with the sealing ring 434 according to this embodiment also interacts with a sealing seat 428 formed on the housing 412.

The actuating portion 436 of the switching element 416 according to this embodiment is of a cylindrical design, in cross section preferably with a round cross section, for example oval or circular. The actuating portion 436 projects from the housing 412 in the direction of the wall 1006 of the master brake cylinder 1000. Provided in the wall 1006 of the inlet neck 1002 of the master brake cylinder 1000 is a recess 1008, which is designed in a corresponding manner to the cross-sectional shape of the actuating element 516. The actuating portion 436 of the switching element 416 is received in sections in the recess 1008 in the wall 1006. The recess 1008 is used to guide the switching element 416.

The switching element 416 is situated according to FIG. 24 in its open position, so that a fluid passage is released. Actuation of the switching element 416 is effected as such in the same manner as described in connection with FIGS. 21 and 22.

The modular leak prevention device 410 is attached together with the fluid container 500 to the master brake cylinder 1000. During the attaching the switching element 416 and/or its actuating portion 436 is received in the recess 1008 and moved counter to the preloading force of the spring 414 into its open position, so that a fluid passage is released by the valve portion 430 of the switching element 416.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. A modular leak prevention device for a fluid container of a vehicle brake system, comprising:
   a housing, by way of which the modular leak prevention device can be attached to a fluid discharge opening of the fluid container, and
   a switching element, which is movable between an open position, in which a fluid passage in the housing is released, and a closed position, in which a fluid passage is closed, wherein the switching element is preloaded into the closed position by at least one preloading member.

2. The modular leak prevention device according to claim 1, wherein in the housing a sealing seat is formed, against which the switching element lies in the closed position.

3. The modular leak prevention device according to claim 1, wherein the switching element in the closed position and in the open position projects at least in sections from an outlet opening for the fluid out of the housing.

4. The modular leak prevention device according to claim 1, wherein the housing comprises at least one inlet opening for the fluid.

5. The modular leak prevention device according to claim 1, wherein the preloading member is one of a compression spring, a tension spring element, and a rubber element, the preloading member communicating with the housing and the switching element.

6. The modular leak prevention device according to claim 1, wherein the switching element comprises a valve portion that is designed to interact with the housing-side sealing seat.

7. The modular leak prevention device according to claim 1, wherein the switching element comprises an actuating portion that is star-shaped or round in cross section.

8. The modular leak prevention device according to claim 1, wherein a fastener for fastening the modular leak prevention device to the fluid container is formed on the housing.

9. The modular leak prevention device according to claim 1, wherein the housing is designed in such a way that it is attachable by a positive connection to the fluid container.

10. The modular leak prevention device according to claim 1, wherein the housing comprises a removable closure element.

11. The modular leak prevention device according to claim 10, wherein the preloading member extends between the closure element and the switching element.

12. The modular leak prevention device according to claim 1, wherein on the outer wall of the housing a circumferential detent projection is provided.

13. A fluid container for a vehicle brake system, wherein the fluid container comprises a modular leak prevention device according to claim 1.

14. The fluid container according to claim 13, wherein the outer wall of the housing of the modular leak prevention device is in fastening engagement with an inner wall of a fluid discharge opening of a discharge neck.

15. A master brake cylinder having the fluid container according to claim 13.

16. A master brake cylinder having a fluid container comprising a modular leak prevention device comprising:
a housing, by way of which the modular leak prevention device can be attached to a fluid discharge opening of the fluid container, and
a switching element, which is movable between an open position, in which a fluid passage in the housing is released, and a closed position, in which a fluid passage is closed, wherein the switching element is preloaded into the closed position by at least one preloading member,
the master brake cylinder comprising an inlet neck for receiving the discharge neck of the fluid container, wherein the inlet neck of the master brake cylinder has a recess that receives the actuating portion of the switching element of the modular leak prevention device.

* * * * *